United States Patent Office 2,827,458
Patented Mar. 18, 1958

2,827,458

PREPARATION OF STRAIGHT CHAIN ACIDS

Stanley B. Mirviss, Roselle, and Elroy J. Inchalik, Metuchen, N. J., assignors to Esso Research and Engineering Company, a corporation of Delaware No Drawing. Application June 19, 1956
Serial No. 592,242

7 Claims. (Cl. 260—540)

The present invention relates to a novel method of preparing organic monocarboxylic acids having from 3 to 30 carbon atoms per molecule. More particularly, this invention relates to a two-stage process of preparing said acids which comprises reacting an aluminum trialkyl in a first stage with carbon dioxide to form the corresponding aluminum salt of the acid and in the second stage, hydrolyzing said aluminum salt to form the desired acid.

The present process provides a particularly attractive method for the preparation of valuable straight chain or normal monocarboxylic acids.

In accordance with the process of this invention an aluminum trialkyl having the formula

wherein each of the R's may be the same or different alkyl radicals containing from 2 to 29 carbon atoms per radical, is in the first stage reacted with carbon dioxide under controlled conditions which result in the addition of a

radical between each of the alkyls and the aluminum to result in an aluminum salt as illustrated by the following equation:

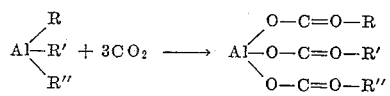

The aluminum salt in a second stage is then hydrolyzed and/or acidified to form the corresponding acids containing one more carbon atom than the alkyl groups in the starting aluminum alkyl as illustrated by the following equations:

(1) 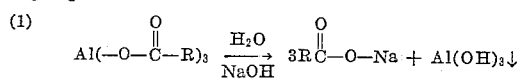

(2) 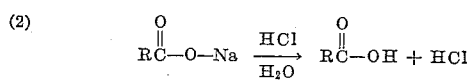

(3) 

Although the starting aluminum alkyl may be derived from any desired source particular benefits will accrue from this process when the aluminum alkyl is prepared by growing ethylene onto low molecular weight aluminum trialkyl or aluminum alkyl hydride in a manner represented by the following reaction wherein ethylene is grown onto aluminum triethyl.

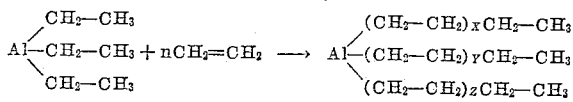

X, Y and Z represent integers which will range from 0–28 and average between about 8–14.

The above reaction may be carried out by passing ethylene through aluminum triethyl, preferably in the presence of a diluent under a wide variety of reaction conditions, e. g., 65°–150° C. and 200–5000 p. s. i. g., preferably 90°–120 C. and 1000–3500 p. s. i. g. It is to be understood that instead of employing aluminum triethyl as the starting aluminum trialkyl in the above reaction other low molecular weight aluminum ($C_2$–$C_4$) alkyls such as aluminum tripropyl, aluminum tributyl, aluminum triisobutyl, aluminum diethyl hydride, aluminum ethyl dihydride, etc., may be employed and in lieu of ethylene a slightly higher molecular weight olefin such as propylene and the like may be substituted. Generally $C_2$–$C_4$ olefins are preferred as the growth hydrocarbon compound.

From the foregoing it can be readily seen that many desired intermediate and high molecular weight acids are obtainable via the present process employing low molecular weight starting materials such as aluminum triethyl and low cost ethylene. For example, $C_5$–$C_{21}$ acids may be readily prepared by this process by reaction with aluminum alkyls wherein said alkyl radicals contain from 4 to 20 carbon atoms. It is to be emphasized that the preparation of the particular aluminum alkyl and especially the aforementioned growth reaction does not form a necessary part of the present process. Rather the description thereof is given merely to amplify and to illustrate the versatility of the present process for the production of a variety of valuable acids. The above described growth reaction may be carried out under conditions to yield aluminum alkyls containing normal alkyl radicals.

Single aluminum trialkyl compounds may be prepared by reacting a higher molecular weight olefin with a low molecular weight aluminum alkyl. In this type reaction the olefin displaces the alkyl radicals in a manner represented by the following equation:

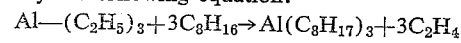

The particular aluminum trialkyl compounds which in accordance with the present process will be reacted with carbon dioxide and which fall within the scope of the present invention may contain branched or normal alkyl radicals. However, it is preferred to employ aluminum compounds containing the straight chain or normal alkyl substituents. Accordingly, the employment of straight chain alkyl aluminum compounds will, when carrying out the instant process, result in a production of straight chain organic monocarboxylic acids which are at present difficultly obtainable and more costly than the branched chain acids. Typical aluminum trialkyls which fall within the scope of this invention are aluminum triethyl, aluminum tripropyl, aluminum tributyl, aluminum trihexyl, aluminum trioctyl, aluminum tridodecyl and higher molecular weight aluminum tri-n-alkyls. Typical of the branched chain compounds are aluminum triisobutyl, aluminum triisooctyl, aluminum triisododecyl, and the like. Some examples of mixed aluminum trialkyls which may be employed are aluminum monoethyl dipropyl, aluminum dipropyl monobutyl, aluminum dioctyl monoisohexyl, aluminum diisododecyl monohexadecyl, aluminum dihexadecyl monoethyl and the like.

A more detailed description of the process including the process conditions required will now be given.

In the first stage of this process gaseous carbon dioxide is passed or bubbled through the desired aluminum trialkyl, perferably in the presence of a diluent at atmospheric to 3000 p. s. i. g. pressures and at a temperature maintained at from −80°–180° C., preferably −20°–

150° C. The time of reaction will be in part dependent on the particular aluminum trialkyl employed as well as on pressure and temperature. However, generally reaction is completed in from 0.1 to 30 hours, preferably 0.1 to 8 hours. It is advisable, especially when reacting low molecular weight aluminum alkyls, to employ an inert diluent such as $C_6$–$C_8$ paraffin, aromatics such as benzene, toluene or the like. The use of a diluent not only prevents runaway reaction but permits better contacting between the carbon dioxide and aluminum alkyl by reducing the viscosity of the aluminum alkyl liquid and particularly the reaction product thereof. The diluent may be employed in the ratio of 0.5 to 20 volumes per volume of aluminum alkyl.

The resultant product mixture from the first or carbonation stage containing the aluminum salt of the desired acid or acids is then hydrolyzed to ultimately form the free acid. Various hydrolyzing techniques may be employed to effect the desired result, the particular selection depending mainly upon the specific composition of the carbonation product mixture. In general, however, the aluminum salt mixture may be treated with an aqueous basic solution such as aqueous sodium or potassium hydroxide to form two phases, the top layer containing the diluent and oil soluble compounds and the bottom aqueous layer containing the alkali salt of the desired acid. Excess aqueous base should be employed to assure complete extraction of the acid radical. After separation of the two layers the aqueous sodium salt layer is then acidified with any aqueous acid, preferably an inorganic acid such as HCl, $HNO_3$, $H_2SO_4$, $H_3PO_4$, or the like, to result in the free acid which may be separated from the mixture by straight or steam distillation or solvent extraction.

While it is preferable in the carbonation stage to react substantially all of the aluminum alkyl, in certain cases this may be difficult and some of the aluminum alkyl will remain unreacted. In such a case the product mixture from the first stage will contain the aluminum salt, hydrocarbon diluent if employed and unreacted aluminum alkyl. If the aluminum alkyl is of a low molecular weight, i. e., the alkyl radicals containing an average of four carbon atoms per radical or less, the mixture may be fractionated to distill off the low molecular weight aluminum alkyl and diluent leaving the aluminum salt which may be treated as indicated above.

In the event, however, that the aluminum alkyl employed which has remained unreacted is of a higher molecular weight, such as aluminum alkyls having an average of over four carbon atoms per alkyl radical, separation by distillation or fractionation would be impractical. In the latter event unreacted aluminum alkyl can be decomposed in one of several ways to accomplish the separation. The product mixture from the carbonation stage containing unreacted aluminum alkyl may be treated with oxygen or air at 20° to 100° C. and 0 to 1000 p. s. i. g., preferably 0–500 p. s. i. g., to form the corresponding aluminum alcoholate from the unreacted aluminum alkyl. This product mixture may be then treated with an aqueous basic solution as indicated above to yield an aqueous phase containing the alkali salt of the acid, a diluent phase containing the alcohol derived from the aluminum alcoholate and a solid phase of precipitated or insoluble aluminum hydroxide. The aqueous phase may then be treated as indicated above by acid and subsequent distillation to recover the free product acid.

Alternatively, after the unreacted aluminum alkyl has been oxidized to the alcoholate, the product mixture containing aluminum salt of the desired acid, diluent and aluminum alcoholate may be treated with any inorganic acid to hydrolyze the mixture. Acids which may be used include HCl, $HNO_3$, $H_2SO_4$, $H_3PO_4$ and the like. In this case the free acid forms in a layer with the diluent and alcohol derived from the alcoholate and the aluminum hydroxide or water soluble aluminum compounds will be present in the aqueous layer. The acid-diluent-alcohol layer may then be treated with an aqueous alkali to extract the acid as a water-soluble salt from the diluent and alcohol. The water-soluble salt may then be treated with acid as indicated above to yield the desired product.

It is to be emphasized, however, that various other means of hydrolyzing and separating the free acid from the carbonation stage product mixture will be apparent to those skilled in the art and that the sole novelty herein does not reside in any specific means of so doing.

It is therefore apparent that the present invention affords a novel and simple means of obtaining primary monocarboxylic acids and especially straight chain acids of relatively high molecular weight by starting with low molecular weight compounds such as aluminum triethyl and ethylene. This invention will be further illustrated by reference to the following examples which describe specific means of preparing heptanoic and propionic acids from aluminum trihexyl and aluminum triethyl respectively.

*Example 1*

Thirty-one grams of aluminum trihexyl and an equal weight of normal heptane were treated with gaseous carbon dioxide at room temperature and atmospheric pressure. An exothermic reaction started almost immediately raising the temperature up to 100° C. At this point the reaction mixture was cooled to about 0° C. and the reaction continued while maintaining the temperature below about 100° C. The complete reaction took about 2 hours. The solution was then cooled to −25° C. and after dilution with 30 grams of normal heptane, air was passed through, the temperature being allowed to rise to room temperature slowly. Finally air was passed through at room temperature for four hours. Then, a solution of 17 grams of sodium hydroxide in 100 grams of water was added. The liquid resulting was decanted from the precipitated alumina and the layers separated. The alumina and the aqueous layer were washed with ether and the ether extract combined with the previously obtained organic layer. The aqueous layer was acidified with iced dilute sulfuric acid and then extracted again with ether. The latter ether extract was dried over anhydrous magnesium sulfate and then the ether was stripped off. The acid residue weighed 7.3 grams. To prove the identity of the acid an aqueous solution of 0.7 gram of the sodium salt of the acid was refluxed with 1 gram of p-bromophenacyl bromide in ethyl alcohol for 1¾ hours. Cooling produced a white solid which after recrystallization from ethanol had a melting point of 68°–70.5° C. The literature melting point of the p-bromophenacyl ester of heptanoic acid is 72° C. The yield was 15 wt. percent of the theoretical.

*Example 2*

Ten grams of aluminum triethyl and eighty grams of normal heptane were treated with carbon dioxide gas at atmospheric pressure from 25°–90° C. over a period of four hours in a manner similar to that described in Example 1. The excess aluminum alkyl was decomposed by the careful addition of twelve grams of methanol. An aqueous solution of sodium carbonate was then added and the mixture distilled until no additional organic material came over. The residue was acidified with cold dilute sulfuric acid and finally distilled. An aliquot portion of the distillate was titrated with sodium hydroxide solution to the phenolphthalein end point. This titration indicated a propionic acid yield of 3.1 grams or 16% of the theoretical value.

While in the above examples relatively low yields of product were recovered these figures can be increased markedly by operating under more severe conditions which might normally be used in a commercial operation.

The use of pressure for example will result in a greater degree of efficiency in the carbonation stage.

It is also to be understood that the process of preparing acids as expressed herein may be carried out in a batch, semi-continuous or continuous procedure as desired.

What is claimed is:

1. A method of preparing monocarboxylic acids which comprises reacting aluminum trialkyl wherein the alkyl radicals each contain from 2 to 20 carbon atoms with carbon dioxide for a period of time sufficient to form an aluminum salt of the desired acid, hydrolyzing the aluminum salt, forming the free acid and recovering free product acid from the mixture.

2. A process of preparing primary monocarboxylic acids which comprises reacting an aluminum trialkyl wherein each of the alkyl groups contains from 2 to 20 carbon atoms with carbon dioxide at −80° to 180° C. and atmospheric to 3000 p. s. i. g. pressures, for a period of time sufficient to convert aluminum trialkyl to the aluminum salt containing one more carbon atom per alkyl radical than the alkyl radicals of the aluminum alkyl, hydrolyzing the resultant aluminum salt in the presence of a hydrolyzing adjuvant and recovering free organic monocarboxylic acid having from 3 to 21 carbon atoms in the molecule.

3. A method in accordance with claim 2 wherein the aluminum trialkyl is aluminum triethyl and the acid is propionic acid.

4. A method in accordance with claim 2 wherein the aluminum trialkyl is aluminum trihexyl and the acid is heptanoic acid.

5. A method of preparing organic acids which comprises contacting an aluminum trialkyl having the following formula

wherein each R represents an alkyl radical containing from 2–20 carbon atoms each with $CO_2$ at −80° to 180° C. and 0–3000 p. s. i. g. for a period of 0.1–30 hours whereby the aluminum trialkyl is converted into an aluminum salt, hydrolyzing said aluminum salt with an aqueous basic solution, acidifying the resultant aqueous solution and recovering an organic monocarboxylic acid having from 3–21 carbon atoms.

6. A method in accordance with claim 5 wherein R, R′ and R″ represent the same alkyl radicals.

7. A method of preparing a mixture of monocarboxylic acids which comprises reacting a mixture of aluminum trialkyls, each alkyl radical containing from 2 to 20 carbon atoms, obtained by reacting a low molecular weight aluminum alkyl said alkyl group containing from 2–4 carbon atoms with a low molecular weight $C_2$—$C_4$ olefin at elevated temperatures and pressures with carbon dioxide at −80° to 180° C. and 0–3000 p. s. i. g., whereby said aluminum trialkyls are converted into aluminum salts, hydrolyzing the resultant mixture of aluminum salts with an aqueous basic solution, acidifying the resultant aqueous solution and recovering a mixture of organic monocarboxylic acids containing from 3 to 21 carbon atoms.

No references cited.